Dec. 13, 1960
W. R. BAILEY
2,963,906
DIFFERENTIAL PRESSURE FLOW METER
Filed Aug. 17, 1955
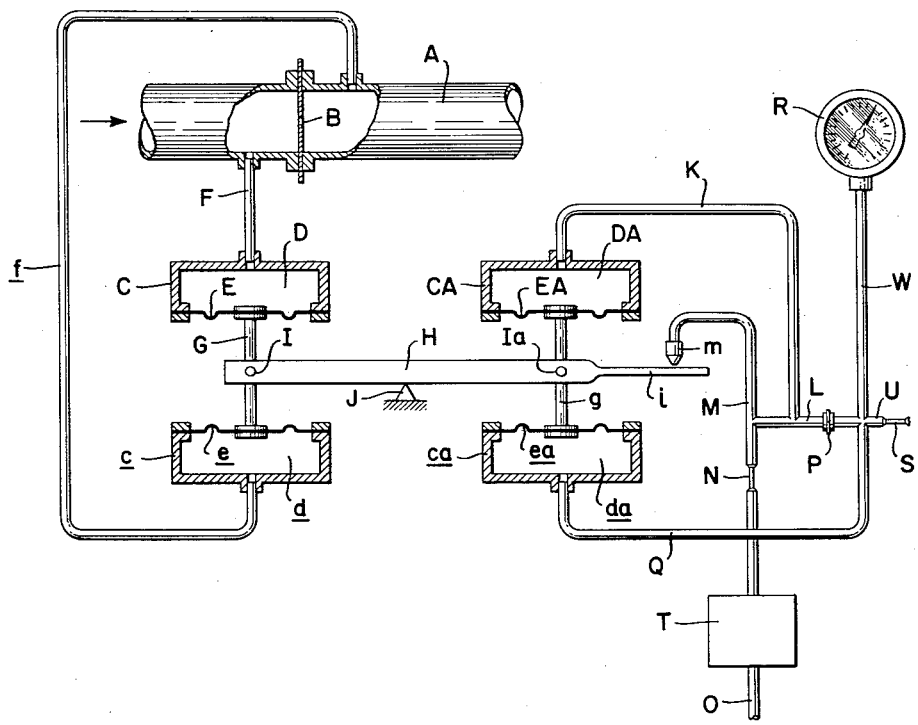
*INVENTOR.*
WILLIAM R. BAILEY
BY Arthur H. Swanson
ATTORNEY.

United States Patent Office 2,963,906
Patented Dec. 13, 1960

2,963,906

DIFFERENTIAL PRESSURE FLOW METER

William R. Bailey, Portsmouth, Va., assignor to Minneapolis-Honeywell Regulator Company, Minneapolis, Minn., a corporation of Delaware Filed Aug. 17, 1955, Ser. No. 528,943

8 Claims. (Cl. 73—205)

A general object of the present invention is to provide a simple and effective flow meter of novel construction and including novel means operative to maintain an output signal varying in linear proportion to the rate at which fluid flows through a conduit. This novel means comprises a first flow conduit whose flow is regulated in accordance with the magnitude of the flow of fluid passing through the aforementioned conduit.

More specifically this novel means comprises a simple and effective means for maintaining a measurable fluid force varying in linear proportion to variations in the pressure drop in the fluid flowing through a restricted orifice interposed between high and low pressure sections of the conduit when the flow is to be determined. In the practice of the invention, the differential between the fluid pressures in these conduit sections separated by a restricted orifice, subjects a balancing mechanism to a measuring force which automatically varies on and in linear accordance with changes in the rate of fluid flow passing through the orifice.

In a preferred practical form of the invention, the measuring apparatus comprises means for subjecting a balancing beam to a tilting force varying in accordance with changes in the differential of the fluid pressures at opposite sides of the conduit orifice. Further, the apparatus comprises means for subjecting the balancing beam to a rebalancing force which increases and decreases as said tilting force increases and decreases in magnitude and thus tends to maintain the beam in an approximately constant normal position as the beam balancing forces increase and decrease.

In a preferred form of the invention, one end of the balancing beam is subjected to the differential of the fluid pressures at the inlet and outlet sides of the restricted orifice, and as the difference between the pressures at the inlet and outlet sides of the orifice vary, the beam tends to tilt proportionally in one direction or the other. However, the tilting of the beam is opposed, and normally eliminated by differential forces so applied to the beam as to neutralize the tilting of the beam on variations in the difference between the pressures at the inlet and outlet sides of the orifice.

In this preferred form of the invention, a relatively small measuring pressure is continuously supplied to a bleed nozzle which subjects the rebalancing end of the beam to a balancing force tending to maintain the beam in a substantially constant position as the flow through the conduit varies. In practice, a fluid balancing pressure impressed on the rebalancing end of the beam is transmitted to a pressure measuring instrument which may be of relatively simple and inexpensive character.

A still more specific object of the present invention is to provide a bleed valve the output pressure of which is regulated by the aforementioned tilting and rebalancing forces applied to the beam to produce a pressure variable linearly with the flow of a fluid in a conduit.

Another specific object of the present invention is to provide the output pressure line of the aforementioned bleed valve with an atmospheric exhaust conduit having a porous plug in its exhaust end so as to enable the flow of fluid passing therethrough to be made a portional and linear function of the flow of a fluid passing through a conduit.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

The drawing diagrammatically illustrates mechanism for maintaining a linear output signal in linear proportion to the rate of fluid flow through a conduit.

The accompanying drawing illustrates a desirable embodiment of the present invention which comprises a conduit A with a restricted orifice B therein. In normal operation, fluid flows through the conduit A in the direction of the arrow at the inlet side of the orifice B. The fluid flowing through the conduit A may be a liquid or a gas, and normally maintains a pressure in the portion of the conduit at the inlet side of the orifice B, which is greater than the conduit pressure at the outlet side of the orifice. A pressure responsive element C encloses a chamber D having a flexible wall E at one side of said chamber and having rigid walls at the other sides of the chamber. A conduit F maintains a pressure in the chamber D equal to the pressure in the portion of the conduit A at the inlet side of the orifice B. The tendency of the fluid pressure in the chamber D to expand that chamber is opposed and partially neutralized by the fluid pressure in the element c which encloses a chamber d. The chamber d is in communication through a conduit f with the portion of the conduit A at the outlet side of the orifice B. The flexible walls E and e are shown as equal in size and directly juxtaposed and are spaced apart by a thrust or strut member G transverse to and having its ends in engagement with the central portions of the walls E and e.

A beam H is shown as having one end connected by a pivot I to the strut G and normally extends transversely to said strut. A portion of the beam H at a distance from the strut G, is connected by a pivot Ia to a strut g parallel to the strut G. The strut g extends between and is connected to the central portions of flexible diaphragms EA and ea. As shown, the beam H engages and rests on the upper edge of a stationary axis or knife edge J intermediate the strut members G and g. The diaphragms EA and ea form the flexible walls of pressure chambers DA and da respectively alongside the chambers D and d. As shown, the knife edge J may be located nearer to the strut G than to the strut g, and the diameters of the chambers DA and da may be the same size as shown but the relative positions and sizes of said chambers and knife edge may also be varied as conditions make desirable.

Fluid under pressure is transmitted to the chamber DA by a pipe K from a variable pressure chamber portion L of an exhaust conduit U. The latter is in communication with a conduit M which is connected through a restricted orifice N to a pipe O supplying air or other fluid at a constant pressure. The end of the pipe M remote from the orifice N and pipe O, is formed with a downwardly extending bleed orifice m above and in variable throttling relation with a flapper valve i shown as an integral extension of the end of the beam H remote from the beam pivot I.

A conduit Q connects the pressure on the right side of the orifice P with the chamber da.

The conduits K and Q thus provide a means of transmitting any change in pressure that takes place on either side of the orifice P to the chambers DA and da as the flapper beam H is moved toward and away from the nozzle due to a change of pressure in the chambers D and d.

As the right hand end of the beam H moves toward and away from the bleed orifice m, the beam extension i serves as a flapper valve to variably restrict fluid outflow through said orifice and thereby vary the fluid pressure in the conduit M and the first or exhaust conduit U. Advantageously and as shown, the variable pressure chamber L is formed with a restricted bleed orifice P the pressure on either side of which is used to balance the initial tilting beam force.

In the operation of the apparatus shown, the differential pressures at the opposite side of the orifice plate B, are transmitted to the pressure chambers D and d and thereby subjects the beam H to a counterclockwise torque which increases and decreases as the pressure differential at the orifice B increases and decreases. The resultant rotative movements then given to the beam in this manner thus raises or lowers the flapper end portion i of the beam I, and thereby varies the outflow of air through the nozzle m.

The counterclockwise torque upon the beam H is balanced by a clockwise torque produced by the pressures acting on the units CA and ca. The pressures on the units CA and ca are produced by the fluid flowing in from supply conduit O through filter T and restriction N to the nozzle m. The back pressure of the nozzle m is held through the orifice P, so that the flow rate through the orifice will be proportional to the back pressure of the nozzle m. As the pressure drop across the orifice P will vary with the rate of fluid flow through the orifice, this pressure drop may be used to supply the operating pressures to the chambers CA and ca. The beam H will be effectively force balanced by the pressures from units CA and ca when the back pressure of the nozzle m is great enough to produce a fluid flow through orifice P proportional to the flow through the orifice B in conduit A.

If it is desired to measure the flow by means of a linear pressure gauge means, such as by the conduit W connected to the gauge R, it is merely necessary to place a partial restriction S downstream of the orifice P.

A satisfactory type of partial restriction which may be used for this purpose e.g. is a plug made of a porous material. It has been found that such a restriction readily permits the gauge R to directly indicate the flow rate of the fluid passing through conduit A in proportional and linear terms.

When the flow rate in the conduit A changes, there will be a resultant change in the forces acting on the beam H which forces will be counterbalanced by the pressure drops across the orifice plate P. Thus, if the flow rate in conduit A should increase, the pressure drop across the orifice B will likewise be increased. As the pressure drop across this orifice B increases in this manner due to an increase flow rate in the conduit A, this pressure drop is used to supply the operating pressures to the chambers c and C so as to move the flapper beam H about the pivot J in a counterclockwise direction. As this beam movement H takes place the flapper end of the beam i will be moved toward the nozzle m from the position shown. This flapper beam movement will cause the back pressure of the nozzle m to increase. As this back pressure of the nozzle m is increased the fluid flow through the orifice P will likewise be increased. As the flow through the orifice P is increased the porous plug S will initially permit a greater flow of the fluid flowing through conduit U to be bled to the atmosphere. As the back pressure in the nozzle is increased the pressure drop across the orifice P will likewise be increased in relation to the rate of flow of this back pressure. This pressure drop is then used to supply the operating pressure to the chamber CA and ca to effectively force balance the beam H. This force balancing action will thus move the flapper i of the beam H about the pivot J in a clockwise direction. The flapper i will be moved in this clockwise direction to a position in which the beam H is in a balanced position. When the flapper i of beam H has been moved to this balance position the rate of the nozzle back pressure passing through the orifice P and the porous plug S will be reduced to a steady flow rate state. When the beam H is in balance and this steady flow rate of fluid passing through the conduit U occurs this flow rate as indicated by the linear pressure gauge R will then be proportional to the flow through the orifice B in the conduit A.

If, on the other hand, the flow rate in conduit A should decrease, the pressure drop across the orifice B would likewise decrease. When this pressure drop is administered to the units CA and ca the beam H will be moved in a clockwise direction about the pivot J. As this clockwise rotation of the beam H occurs the flapper end of the beam i will be moved initially away from the nozzle M. This flapper nozzle action will cause the rate at which the back pressure is being bled through the orifice P and the porous plug S to be decreased. As this decrease in nozzle back pressure passing through the orifice P occurs the pressure drop across this orifice P will likewise be decreased. As this pressure drop decrease occurs the chambers CA and ca connected to the conduit U on either side of this orifice P will permit the flapper i of beam H to be moved in a counterclockwise direction toward the nozzle m or beam balanced position. When the flapper is moved toward the nozzle m in this manner the nozzle back pressure will be increased. Furthermore, when the flapper i is in this beam balance position the rate of flow of the nozzle back pressure passing through the orifice P and the partial restriction S in conduit U will have been increased to a steady flow state. When this steady flow state occurs the linear pressure gauge R will indicate the magnitude of the increase in flow which has occurred in flow line A in a proportional and linear manner.

With the aforementioned arrangement it is possible to indicate in a proportional and linear manner any flow changes occurring in flow line A by connecting a conventional pressure gauge such as the gauge R to the atmospheric exhaust line U by means of conduit W as shown.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention what I claim as new and desire to secure by Letters Patent is as follows:

1. A differential to linear pressure transducer comprising, a pivoted beam, a differential pressure actuated means, said pressure actuated means being operably connected to said beam to apply a force to one end of said beam in accordance with the magnitude of a differential pressure being applied thereto, a pneumatic bleed valve located at the other end of said beam having a constant fluid pressure flowing therethrough and out of an output conduit connected thereto, said pressure in said output conduit being regulated by said movement of said beam, a first chamber operably connected internally to said fluid pressure in said output conduit and externally by way of a flexible wall of said chamber to a portion near the said other end of said beam, said output pressure conduit of said bleed valve being operably connected to an atmospheric exhaust conduit, an orifice in said exhaust conduit, a restriction at the atmosphere exhaust end of said conduit, a second chamber connected externally by way of a flexible wall of said second chamber to said beam, said second chamber being connected internally to the fluid pressure flowing through a portion of said exhaust conduit that is between said orifice and said restriction, and a linear pressure actuated indicating means operably connected to said last mentioned conduit portion to indicate changes in magnitude of the rate of flow of fluid passing through said conduit portion.

2. A differential pressure to linear pressure transducer comprising, a first pressure actuating means for positioning a flapper beam toward or away from a bleed nozzle depending on whether the magnitude of a differential pressure is decreasing or increasing, a constant fluid pressure flowing through and out of said nozzle and through a branch connected to said nozzle having an orifice and a porous plug exhaust port, a first conduit connected at one end to the nozzle side of said orifice and at its other end to a first pressure chamber having a flexible wall connected for movement with a portion of the beam adjacent said nozzle, a second conduit connected at one end to the other side of said orifice and at its other end to a second pressure chamber having a flexible wall connected for movement with a side of the beam directly opposite to that which the first flexible wall is connected, said first and second pressure conduits and said pressure chambers acting to apply the difference in pressure existing on either side of said orifice to said beam to balance out the beam positioning action of said pressure actuating means, and a linear pressure actuated indicating means connected to the portion of said branch between said orifice and said exhaust port to indicate changes in the magnitude of the rate of fluid passing therethrough.

3. A control mechanism for maintaining a proportionality and linear relationship between the flow of a fluid pressure passing through an unrestricted portion of a conduit having a partially restricted open end and the flow of fluid passing through a first flow line comprising, a beam operably mounted to rotate on a pivot, an expansible beam actuating means located at one end of the beam, pressure connections between said first flow line and said expansible means to transmit an increasing pressure force to said beam actuating means to progressively move said beam in a clockwise direction about said pivot whenever the magnitude of the flow of said fluid pressure occurring in said first flow line decreases, or to transmit a decreasing pressure force to said beam to progressively move said beam in a counter-clockwise direction about said pivot whenever the last mentioned flow in said first flow line increases, a passageway between a bleed valve and the end opposite the restricted end of said unrestricted portion, said beam being operably connected at its other end to said bleed valve to progressively decrease the magnitude of a regulatable fluid passing through said passageway to said unrestricted portion whenever said pressure force on said beam is being progressively decreased and to progressively increase said regulatable flow whenever the said force on said beam is being progressively increased, an orifice positioned in said unrestricted portion, a second beam actuating means connected to portions of said unrestricted portion located on opposite sides of said orifice and to the valve end of the beam to force said beam to be rotated in a clockwise direction about its pivot whenever the difference in pressure of the fluid on either side of said orifice increases or to force said beam to be rotated in a counter-clockwise direction about said pivot whenever said last mentioned pressure difference decreases and a flow indicating means connected to the said unrestricted portion of said conduit between said orifice and said partial restriction.

4. An apparatus to linearly measure the flow rate of a fluid passing through an orifice in a plate located in a first flow line, comprising a differential pressure responsive means operably connected to the fluid on either side of said orifice, a bleed valve operably connected to said responsive means, a supply conduit through which a constant fluid pressure flows to and out of said bleed valve and to and out of a second flow line having an orifice plate and a porous plug exhaust port located therein, said differential pressure responsive means and said bleed valve being operably connected to continuously regulate the magnitude of said fluid flowing through said orifice plate to a value which is proportional and linear to the magnitude of a fluid flowing through said first mentioned orifice and a linear pressure actuated indicating means connected to said fluid that has passed through said orifice in said second flow line to indicate changes in the magnitude of the rate of fluid passing therethrough.

5. An apparatus to linearly measure the flow rate of a fluid passing through an orifice in a plate located in a first flow line, comprising a differential pressure responsive means operably connected to the fluid on either side of said orifice, a bleed valve operably connected to said responsive means, a supply conduit through which a constant fluid pressure flows to and out of said bleed valve and to and out of a second flow line having an orifice plate located therein, said differential pressure responsive means and said bleed valve being operably connected to continuously regulate the magnitude of a fluid flowing through said last mentioned orifice plate and a partially restricted end portion located in said second flow line to a value which is proportional and linear to the magnitude of a fluid flowing through said first mentioned orifice and a linear pressure actuated indicating means connected to said fluid that has passed through said orifice in said second flow line to indicate changes in the magnitude of the rate of fluid passing therethrough.

6. An apparatus to linearly measure the flow rate of a fluid passing through an orifice in a plate located in a first flow line, comprising a differential pressure responsive means operably connected to the fluid on either side of said orifice, a bleed valve operably connected to said responsive means, a supply conduit through which a constant fluid pressure flows to and out of said bleed valve and to and out of a second flow line having an orifice plate located therein, said differential pressure responsive means and said bleed valve being operably connected to continuously regulate the magnitude of a fluid flowing through said last mentioned orifice plate and a partially restricted end portion located in said second flow line to a value which is proportional and linear to the magnitude of a fluid flowing through said first mentioned orifice and a pressure actuated indicating means operably connected to the flow of fluid passing through said second mentioned flow line between its orifice plate and its partially restricted end portion to indicate changes in the magnitude of the rate of fluid flowing through said second mentioned flow line.

7. Apparatus for measuring the rate of fluid flowing through a conduit, comprising a first differential pressure responsive means adapted for connection to said conduit to produce a force proportional to the rate of flow of fluid through said conduit, movable flapper means connected to said first differential pressure responsive means to be moved thereby, a second means sensing the motion of said movable flapper means, said second means having a bleed valve provided with a constant fluid pressure flowing therethrough associated with said flapper means to produce a second fluid flow in a partially restricted open ended conduit having an orifice plate therein and one of its ends connected to said bleed valve, said second fluid flow being proportional to the motion of said flapper means, a second differential pressure responsive means connected on either side of said orifice plate to respond to said second fluid flow and to produce on said movable means a force proportional to said second fluid flow to balance said movable means and means responsive to a pressure condition created by said second fluid flow for indicating directly the magnitude of said first fluid flow.

8. An apparatus to linearly and proportionally measure the flow rate of a first fluid passing through a first flow line, comprising a first means operably connected to said flow line to produce an output force proportional to said flow therein, a force responsive means having a bleed valve operably connected for movement with said first mentioned means, a supply conduit through which a constant fluid pressure flows to and out of said bleed valve and to and out of a second flow line having a porous exhaust port therein, a second means to produce a differential pressure force proportional to the pressure drop across an orifice plate located in said second flow line, said second means being operable to produce a balancing force on said force responsive means, said bleed valve means being responsive to any unbalance in said forces acting on said force responsive means to adjust the flow in said second flow line to a value proportional to that in said first flow line and a linear pressure actuated indicating means connected to said fluid that has passed through said orifice in said second flow line to indicate changes in the magnitude of the rate of fluid passing therethrough.

References Cited in the file of this patent

UNITED STATES PATENTS

| | | |
|---|---|---|
| 2,246,934 | Denney | June 24, 1941 |
| 2,285,540 | Stein et al. | June 9, 1942 |
| 2,408,685 | Rosenberger | Oct. 1, 1946 |
| 2,441,044 | Tate | May 4, 1948 |
| 2,509,078 | Stover | May 23, 1950 |
| 2,675,818 | Gallo | Apr. 20, 1954 |
| 2,736,199 | Ibbott | Feb. 28, 1956 |